(12) United States Patent
Ezaki (10) Patent No.: US 8,738,272 B2
(45) Date of Patent: May 27, 2014

(54) CONTROL APPARATUS FOR INTERNAL COMBUSTION ENGINE INCLUDING VARIABLE VALVE OPERATING APPARATUS

(75) Inventor: Shuichi Ezaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 12 days.

(21) Appl. No.: 13/501,107

(22) PCT Filed: Dec. 16, 2009

(86) PCT No.: PCT/JP2009/070997
§ 371 (c)(1),
(2), (4) Date: Apr. 10, 2012

(87) PCT Pub. No.: WO2011/074090
PCT Pub. Date: Jun. 23, 2011

(65) Prior Publication Data
US 2012/0245828 A1      Sep. 27, 2012

(51) Int. Cl.
*F02D 21/08*      (2006.01)

(52) U.S. Cl.
USPC .............................................. 701/105; 60/285

(58) Field of Classification Search
USPC ............ 60/277, 284, 285; 123/27 R, 198 DB, 123/90.15–90.17, 300, 481, 493; 701/102, 701/112–114
See application file for complete search history.

(56) References Cited

U.S. PATENT DOCUMENTS 6,029,618 A   2/2000 Hara et al.
6,148,611 A   11/2000 Sato
(Continued)

FOREIGN PATENT DOCUMENTS

DE    102 40 067 A1    4/2003
DE    699 19 607 T2    9/2005
(Continued)

OTHER PUBLICATIONS

Office Action dated Jun. 25, 2013, issued in German Patent Application No. 11 2009 005 447.1.
(Continued)

*Primary Examiner* — Stephen K Cronin
*Assistant Examiner* — Elizabeth Hadley
(74) *Attorney, Agent, or Firm* — Oblon, Spivak, McClelland, Maier & Neustadt, L.L.P.

(57) ABSTRACT

Provided is a control apparatus for an internal combustion engine that can suppress deterioration of a catalyst that is ascribable to a control delay of a variable valve operating apparatus when transitioning to a valve stopped state accompanying a fuel-cut operation, or when transitioning from the valve stopped state to a combustion limit operating state. An intake variable valve operating apparatus capable of changing the operating state of an intake valve to a valve stopped state by continuously changing a lift amount and working angle of the intake valve is included. When the temperature of a catalyst is equal to or greater than a predetermined temperature, fuel injection is executed to supply fuel into an exhaust passage during a period in which the operating state of the intake valve transitions to the valve stopped state, during a period in which a fuel-cut operation is executed in the valve stopped state, or during a period in which the operating state of the intake valve transitions from the valve stopped state to a return limit operating state.

9 Claims, 8 Drawing Sheets

100   IS THERE A REQUEST TO EXECUTE F/C OPERATION?
102, 116   EQUAL TO OR GREATER THAN PREDETERMINED CATALYST TERMPERATURE?
104   CHANGE TO COMBUSTION LIMIT MINIMUM WORKING ANGLE
106   RECORD TIME AND NUMBER OF REVOLUTIONS
108, 112   EXECUTE F/C OPERATION
110, 114   CHANGE TO VALVE STOPPED STATE
118   RECORD TIME
120   CALCULATE OUTFLOW AIR AMOUNT A

(56) References Cited

U.S. PATENT DOCUMENTS

| | | | |
|---|---|---|---|
| 6,526,745 B1 * | 3/2003 | Ogiso | 60/285 |
| 7,204,226 B2 * | 4/2007 | Zillmer et al. | 123/295 |
| 8,443,588 B2 * | 5/2013 | Nishikiori et al. | 60/285 |
| 2001/0023674 A1 | 9/2001 | Shimizu et al. | |
| 2002/0017256 A1 * | 2/2002 | Shiraishi et al. | 123/90.15 |
| 2003/0041838 A1 | 3/2003 | Tsuchiya | |
| 2009/0223207 A1 * | 9/2009 | Ren | 60/286 |
| 2011/0271918 A1 * | 11/2011 | Nishikiori et al. | 123/90.1 |

FOREIGN PATENT DOCUMENTS

| | | |
|---|---|---|
| DE | 601 08 290 T2 | 1/2006 |
| JP | 08193537 A  * | 7/1996 |
| JP | 11 324748 | 11/1999 |
| JP | 2000 282901 | 10/2000 |
| JP | 2001 182570 | 7/2001 |
| JP | 3799944 | 7/2006 |
| JP | 2006 291840 | 10/2006 |
| JP | 3893202 | 3/2007 |
| JP | 2007 239551 | 9/2007 |
| JP | 2008 45460 | 2/2008 |
| JP | 2008 121458 | 5/2008 |
| JP | 2008 274760 | 11/2008 |

OTHER PUBLICATIONS

International Search Report Issued Jan. 19, 2010 in PCT/JP09/70997 Filed Dec. 16. 2009.

* cited by examiner

*1 Position of control shaft
*2 Cam angle

100 IS THERE A REQUEST TO EXECUTE F/C OPERATION?
102, 116 EQUAL TO OR GREATER THAN PREDETERMINED CATALYST
       TERMPERATURE?
104    CHANGE TO COMBUSTION LIMIT MINIMUM WORKING ANGLE
106    RECORD TIME AND NUMBER OF REVOLUTIONS
108, 112 EXECUTE F/C OPERATION
110, 114 CHANGE TO VALVE STOPPED STATE
118    RECORD TIME
120    CALCULATE OUTFLOW AIR AMOUNT A

200 IS THERE A START-UP REQUEST?
202, 208 EQUAL TO OR GREATER THAN PREDETERMINED CATALYST TERMPERATURE?
204 RECORD TIME
206 CHANGE TO COMBUSTION LIMIT MINIMUM WORKING ANGLE
210 RECORD TIME AND NUMBER OF REVOLUTIONS
212 CALCULATE TOTAL OUTFLOW AIR AMOUNT (A+B)
214 INJECT AFTERBURNING FUEL INTO CYLINDER DURING EXHAUST STROKE
216 EXECUTE STARTUP
218 CHANGE TO REQUESTED WORKING ANGLE

Fig. 8

200 IS THERE A START-UP REQUEST?
206 CHANGE TO COMBUSTION LIMIT MINIMUM WORKING ANGLE
208 EQUAL TO OR GREATER THAN PREDETERMINED CATALYST TERMPERATURE?
216 EXECUTE STARTUP
218 CHANGE TO REQUESTED WORKING ANGLE
300 IS COMBUSTION LIMIT MINIMUM NUMBER OF REVOLUTIONS REACHED?
302 CALCULATE TOTAL OUTFLOW AIR AMOUNT (A+B)
304 INJECT AFTERBURNING FUEL INTO CYLINDER DURING EXHAUST STROKE

CONTROL APPARATUS FOR INTERNAL COMBUSTION ENGINE INCLUDING VARIABLE VALVE OPERATING APPARATUS

TECHNICAL FIELD

The present invention relates to a control apparatus for an internal combustion engine that includes a variable valve operating apparatus.

BACKGROUND ART

A conventional internal combustion engine that has a variable valve operating mechanism that can maintain at least one of an intake valve and an exhaust valve in a closed state is disclosed, for example, in Patent Document 1. According to this conventional internal combustion engine, a configuration is adopted so that, when a fuel-cut operation is performed in a situation in which the temperature of an exhaust purification catalyst that is arranged in an exhaust passage is equal to or greater than a predetermined temperature, the variable valve operating mechanism is controlled so as to place at least one of the exhaust valve and the intake valve in a closed state. Thus, supply of gas that has a high oxygen concentration to the exhaust purification catalyst that is in a high-temperature state is prevented, and deterioration of the exhaust purification catalyst is suppressed.

Further, for example, in Patent Document 2, a conventional configuration is disclosed that includes, in a variable valve operating apparatus capable of continuously changing the valve opening characteristics of a valve, a valve stop mechanism that can alternatively switch an operating state of the valve between a valve working state and a valve stopped state.

The applicant is aware of the following documents, which includes the above described document, as documents related to the present invention.

CITATION LIST

Patent Documents

Patent Document 1: Japanese Laid-open Patent Application Publication No. 2001-182570
Patent Document 2: Japanese Laid-open Patent Application Publication No. 2007-239551
Patent Document 3: Japanese Laid-open Patent Application Publication No. 2008-045460
Patent Document 4: Japanese Laid-open Patent Application Publication No. 2008-121458
Patent Document 5: Japanese Patent No. 3799944
Patent Document 6: Japanese Patent No. 3893202
Patent Document 7: Japanese Laid-open Patent Application Publication No. 2000-282901
Patent Document 8: Japanese Laid-open Patent Application Publication No. 2006-291840

SUMMARY OF INVENTION

Technical Problem

In a variable valve operating apparatus that can continuously change a lift amount and/or a working angle (hereunder, abbreviated to simply a "working angle") of a valve, when changing an operating state of the valve to a valve stopped state in which the valve is maintained in a closed state when executing a fuel-cut operation, it is necessary to change the operating state of the valve to the aforementioned valve stopped state by continuously changing the working angle of the valve. As a result, the time required to transition the operating state of the valve to the valve stopped state and, further, the time required to transition (return) the operating state of the valve from the valve stopped state to a combustion limit operating state in which a minimum working angle of the valve at which combustion of the internal combustion engine is enabled can be obtained increase compared to a variable valve operating apparatus that can alternatively switch the operating state of the valve between a valve working state and a valve stopped state. As a result, there is a risk of fresh air flowing out toward the catalyst during such a transition period.

Further, as in the case of the configuration described in the aforementioned Patent Document 2, a configuration is known in which a valve stop mechanism that makes it possible to alternatively switch the operating state of a valve between a valve working state and a valve stopped state is combined with a variable valve operating apparatus that can continuously change a lift amount and/or a working angle of the valve. However, according to such a configuration, the cost and constitution of the variable valve operating apparatus increase.

The present invention has been conceived to solve the above described problems, and an object of the present invention is to provide a control apparatus for an internal combustion engine that, with respect to a variable valve operating apparatus capable of changing an operating state of a valve to a valve stopped state in which the valve is maintained in a closed state by continuously changing a lift amount and/or a working angle of the valve, can suppress deterioration of a catalyst that is ascribable to a control delay of the variable valve operating apparatus when transitioning to a valve stopped state accompanying a fuel-cut operation or when transitioning from a valve stopped state to a combustion limit operating state.

Solution to Problem

A first aspect of the present invention is a control apparatus for an internal combustion engine including a variable valve operating apparatus that, by continuously changing a lift amount and/or a working angle of a valve, is capable of changing an operating state of the valve to a valve stopped state in which the valve is maintained in a closed state, the control apparatus comprising:
  valve stop execution means that, when a request to execute a fuel-cut operation is generated during operation of the internal combustion engine, controls so that the operating state of the valve becomes the valve stopped state using the variable valve operating apparatus;
  catalyst temperature acquisition means that acquires a temperature of a catalyst that is arranged in an exhaust passage; and
  fuel injection execution means that, when the temperature of the catalyst is equal to or greater than a predetermined temperature, executes fuel injection so that fuel is supplied into the exhaust passage during a period in which the operating state of the valve transitions to the valve stopped state, a period in which the fuel-cut operation is executed in the valve stopped state, or a period in which the operating state of the valve transitions from the valve stopped state to a combustion limit operating state in which a minimum lift amount and/or working angle of the valve at which combustion of the internal combustion engine is enabled is obtained.

A second aspect of the present invention is the control apparatus for an internal combustion engine including a variable valve operating apparatus according to the first aspect of the present invention, the control apparatus further comprising:

valve stopped time air amount acquisition means that acquires an air amount that flows out from inside a cylinder toward the catalyst during a process of the operating state of the valve transitioning to the valve stopped state, wherein the fuel injection execution means executes the fuel injection with an amount that is in accordance with an air amount that is acquired by the valve stopped time air amount acquisition means.

A third aspect of the present invention is the control apparatus for an internal combustion engine including a variable valve operating apparatus according to the second aspect of the present invention, the control apparatus further comprising:

valve operation amount acquisition means that acquires a lift amount and/or a working angle of the valve, wherein the valve stopped time air amount acquisition means is means that estimates and acquires the air amount based on a value of a lift amount and/or a working angle of the valve that is acquired by the valve operation amount acquisition means.

A fourth aspect of the present invention is the control apparatus for an internal combustion engine including a variable valve operating apparatus according to any one of the first to third aspects of the present invention, the control apparatus further comprising fuel cut inhibition means that, when a request to execute the fuel-cut operation is generated, if the temperature of the catalyst is equal to or greater than the predetermined temperature, inhibits execution of the fuel-cut operation until the operating state of the valve during transition to the valve stopped state reaches the combustion limit operating state.

A fifth aspect of the present invention is the control apparatus for an internal combustion engine including a variable valve operating apparatus according to the first aspect of the present invention, the control apparatus further comprising:

valve return time air amount acquisition means that acquires an air amount that flows out from inside a cylinder toward the catalyst in a process of the operating state of the valve transitioning from the valve stopped state to the combustion limit operating state, wherein the fuel injection execution means executes the fuel injection with an amount that is in accordance with an air amount that is acquired by the valve return time air amount acquisition means.

A sixth aspect of the present invention is the control apparatus for an internal combustion engine including a variable valve operating apparatus according to the fifth aspect of the present invention, the control apparatus further comprising:

valve operation amount acquisition means that acquires a lift amount and/or a working angle of the valve, wherein the valve return time air amount acquisition means is means that estimates and acquires the air amount based on a value of the lift amount and/or the working angle of the valve that is acquired by the valve operation amount acquisition means.

Advantageous Effects of Invention

According to the first aspect of the present invention, when the temperature of the catalyst is equal to or greater than the predetermined temperature, fuel injection is executed so as to supply fuel into the exhaust passage, for example, during a period in which the operating state of the valve transitions to the valve stopped state. It is thereby possible to burn oxygen included in air that flows out into the exhaust passage from inside a cylinder by means of afterburning in the exhaust passage. Thus, the aforementioned air that flows out from inside a cylinder can be prevented from flowing in a high oxygen concentration state into the catalyst that is in a high-temperature state. Consequently, it is possible to suppress deterioration of the catalyst that is ascribable to a control delay of the variable valve operating apparatus when transitioning to a valve stopped state accompanying a fuel-cut operation or when transitioning from a valve stopped state to the combustion limit operating state.

According to the second aspect of the present invention, the above described fuel injection can be performed with an appropriate amount that is in accordance with an air amount that flows out from inside the cylinder toward the catalyst in the course of the operating state of the valve transitioning to a valve stopped state, without being influenced by fluctuations in the number of engine revolutions when executing a fuel-cut operation.

According to the third aspect of the present invention, an air amount that flows out from inside the cylinder toward the catalyst during the course of the operating state of the valve transitioning to a valve stopped state can be estimated and acquired in a simple manner based on a value of the lift amount and/or the working angle of the valve that is acquired by the valve operation amount acquisition means.

According to the fourth aspect of the present invention, in comparison to a case in which a fuel-cut operation is immediately executed upon receiving an execution request without the consideration given in this respect according to the present invention, an air amount that flows out from inside the cylinder toward the catalyst when transitioning to a valve stopped state accompanying a fuel cut can be reduced.

According to the fifth aspect of the present invention, the above described fuel injection can be performed with an appropriate amount that is in accordance with an air amount that flows out from inside the cylinder toward the catalyst in the course of the operating state of the valve transitioning from a valve stopped state to the combustion limit operating state, without being influenced by fluctuations in the number of engine revolutions when executing a fuel-cut operation.

According to the sixth aspect of the present invention, an air amount that flows out from inside the cylinder toward the catalyst during the course of the operating state of the valve transitioning from a valve stopped state to the combustion limit operating state can be estimated and acquired in a simple manner based on a value of the lift amount and/or the working angle of the valve that is acquired by the valve operation amount acquisition means.

DESCRIPTION OF SYMBOLS 10 internal combustion engine
12 piston
14 combustion chamber
16 intake passage
18 exhaust passage
24 fuel injection valve
26 spark plug
28 intake valve
30 exhaust valve
32 intake variable valve operating apparatus
36 catalyst
38 crankshaft
40 ECU (Electronic Control Unit)
42 crank angle sensor
50 camshaft
52 drive cam
54 control shaft
56 control shaft driving mechanism
62 servomotor
64 EDU (Electrical Driver Unit)
66 cam angle sensor
68 control shaft position sensor
70 swing arm
72 slide surface
74 first roller
76 second roller
78 support arm
80 control arm
82 swing cam surface
82a non-working surface
82b working surface
84 rocker arm
86 rocker roller
92 lost motion portion

DESCRIPTION OF EMBODIMENTS

First Embodiment

System Configuration of Internal Combustion Engine

Figure 1:
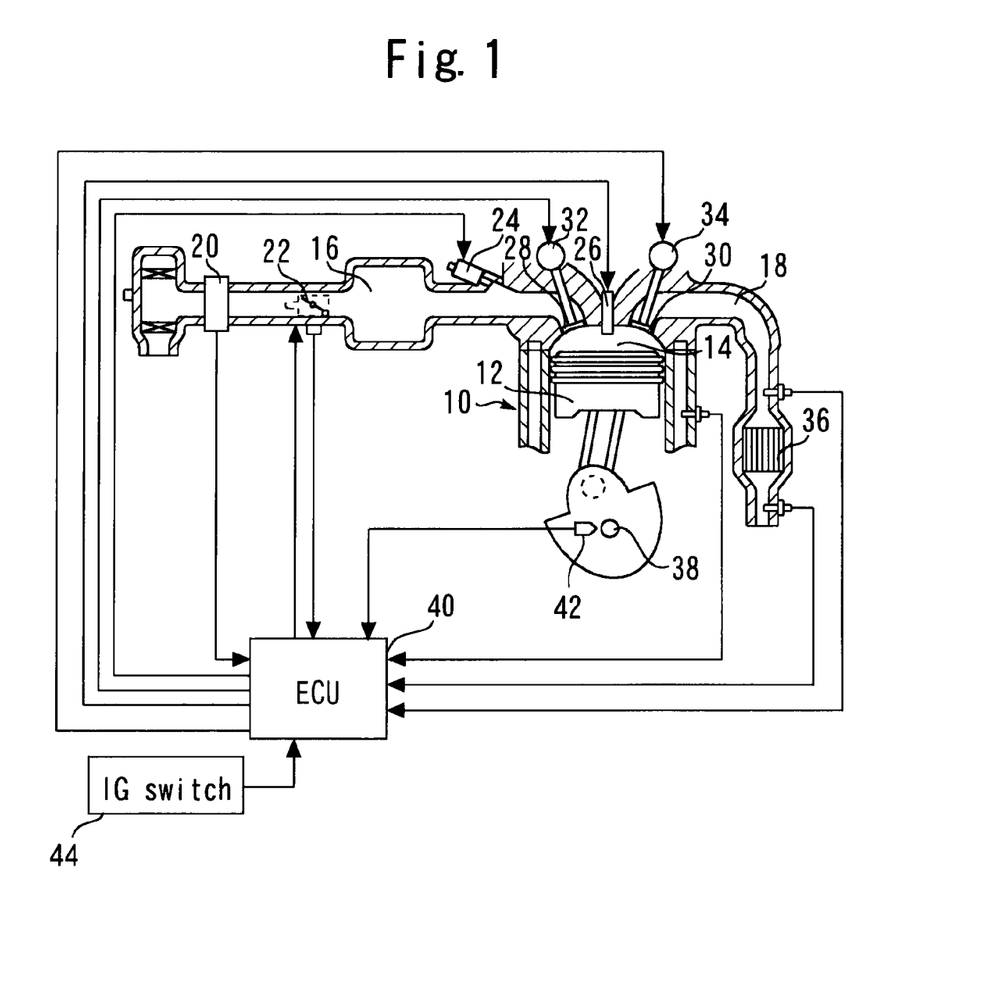
FIG. 1 is a view for describing a system configuration of an internal combustion engine according to a first embodiment of the present invention.

FIG. 1 is a view for describing the system configuration of an internal combustion engine 10 according to a first embodiment of the present invention. A system of the present embodiment includes the internal combustion engine 10. Although the number of cylinders of an internal combustion engine according to the present invention is not particularly limited, in this case, as one example, it is assumed that the internal combustion engine 10 is an in-line four-cylinder engine. A piston 12 is provided in each cylinder of the internal combustion engine 10. A combustion chamber 14 is formed at the top side of the piston 12 in each cylinder of the internal combustion engine 10. An intake passage 16 and an exhaust passage 18 communicate with the combustion chamber 14.

An air flow meter 20 that outputs a signal in accordance with the flow rate of air that is drawn into the intake passage 16 is provided in the vicinity of an inlet of the intake passage 16. A throttle valve 22 is provided downstream of the air flow meter 20. A fuel injection valve 24 for injecting fuel into an intake port of the internal combustion engine 10 is arranged downstream of the throttle valve 22. A spark plug 26 is mounted to a cylinder head included in the internal combustion engine 10. The spark plug 26 is arranged so as to protrude inside the combustion chamber 14 from the top of the combustion chamber 14. An intake valve 28 and an exhaust valve 30 are provided in an intake port and an exhaust port, respectively. The intake valve 28 and the exhaust valve 30 are used to place the combustion chamber 14 and the intake passage 16, or the combustion chamber 14 and the exhaust passage 18, in a connecting state or a shut-off state, respectively.

The intake valve 28 and the exhaust valve 30 are driven by an intake variable valve operating apparatus 32 and an exhaust valve operating apparatus 34, respectively. The configuration of the intake variable valve operating apparatus 32 is described in detail later referring to FIG. 2 and FIG. 3. In this connection, a valve operating apparatus that drives the exhaust valve 30 may have the same configuration as the intake variable valve operating apparatus 32. A catalyst 36 for purifying exhaust gas is arranged in the exhaust passage 18.

The system shown in FIG. 1 is equipped with an ECU (Electronic Control Unit) 40. Various sensors for detecting the operating state of the internal combustion engine 10, such as the aforementioned air flow meter 20 and a crank angle sensor 42 that detects the number of engine revolutions, as well as an ignition switch (IG switch) 44 of the vehicle are connected to an input side of the ECU 40. Further, various actuators for controlling the operating state of the internal combustion engine 10, such as the aforementioned throttle valve 22, the fuel injection valve 24, the spark plug 26, and the intake variable valve operating apparatus 32 are connected to an output side of the ECU 40. The ECU 40 controls the operating state of the internal combustion engine 10 based on the outputs of the above described sensors.

Figure 2:
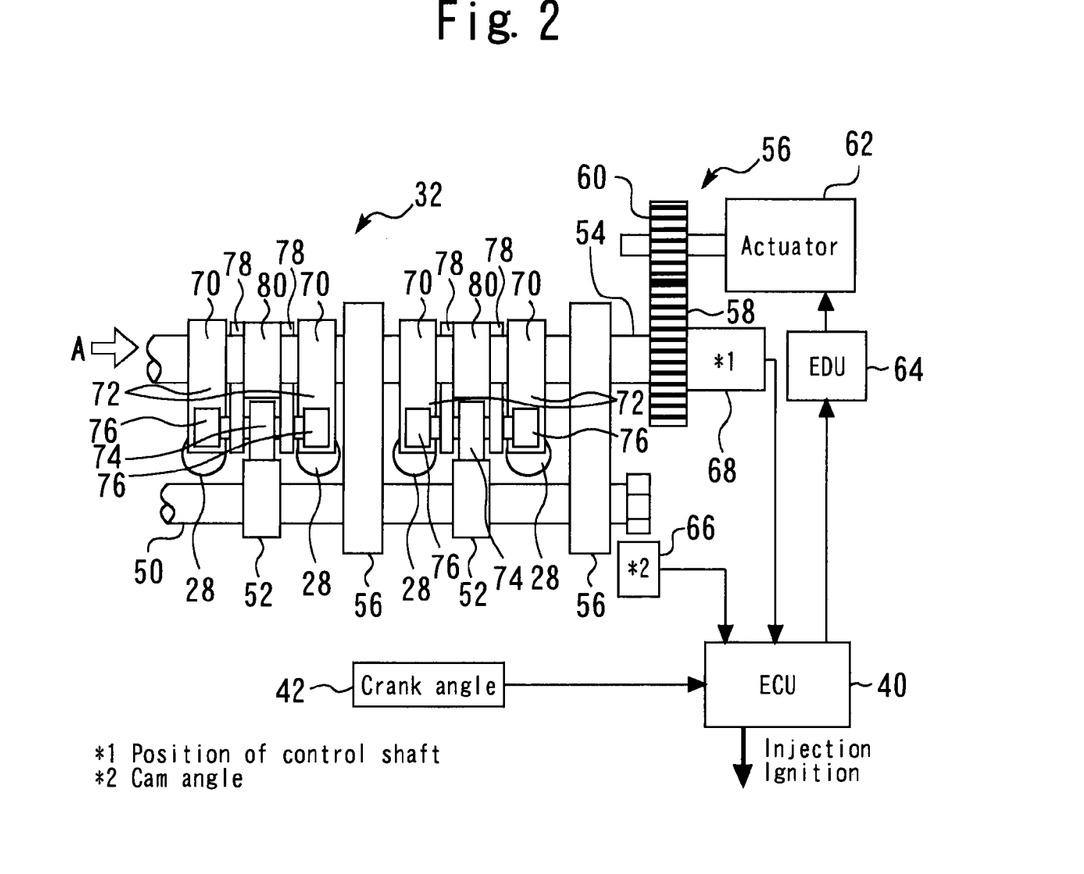
FIG. 2 is a view that illustrates a schematic configuration of an intake variable valve operating apparatus shown in FIG. 1.
Figure 3:
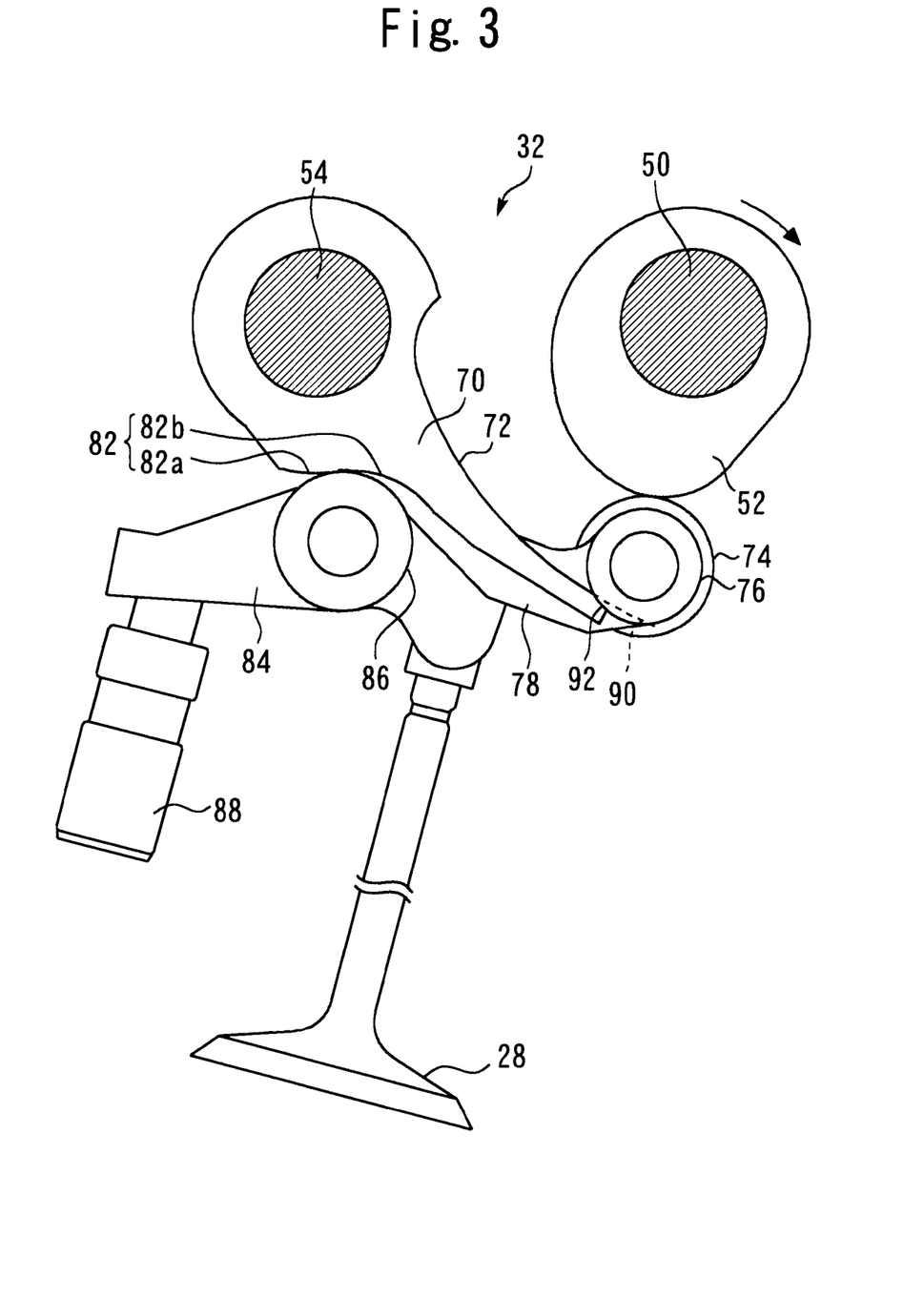
FIG. 3 is a view of the intake variable valve operating apparatus shown in FIG. 2 as seen from the axial direction (more specifically, the direction of arrow A in FIG. 2) of a camshaft (and a control shaft)

Next, the configuration and operations of the intake variable valve operating apparatus 32 are described referring to FIG. 2 and FIG. 3.

[Configuration of Variable Valve Operating Apparatus]

FIG. 2 is a view that illustrates the schematic configuration of the intake variable valve operating apparatus 32 shown in FIG. 1. FIG. 3 is a view of the intake variable valve operating apparatus 32 shown in FIG. 2 as seen from the axial direction (more specifically, the direction of arrow A in FIG. 2) of a camshaft 50 (and a control shaft 54). In this connection, configurations relating to only two of the four cylinders of the internal combustion engine 10 are illustrated in FIG. 2, and illustration of the remaining cylinders is omitted.

The intake variable valve operating apparatus 32 is an apparatus that can continuously change a working angle and a lift amount (hereunder, when it is not particularly necessary to distinguish between the working angle and lift amount, they are abbreviated to simply "working angle") of the intake valve 28 in accordance with a rotational position of the control shaft 54 that is described later. The intake variable valve operating apparatus 32 is configured to be able to change the operating state of the intake valve 28 to a valve stopped state in which the intake valve 28 is maintained at a closed position (zero lift) by continuously changing (decreasing) the working angle of the intake valve 28.

The intake variable valve operating apparatus 32 includes a drive cam 52 provided on the camshaft 50 that is rotationally driven by a crankshaft 38 of the internal combustion engine 10, and the control shaft 54 that is arranged in parallel with the camshaft 50. The drive cam 52 rotates in the clockwise direction in FIG. 3.

As shown in FIG. 2, the intake variable valve operating apparatus 32 also includes a control shaft driving mechanism 56 that can rotate the control shaft 54 within a predetermined angle range. The control shaft driving mechanism 56 includes a worm wheel 58 that is fixed to one end side of the control shaft 54, a worm gear 60 that engages with the worm wheel 58, and a servomotor 62 that rotationally drives the worm gear 60. The servomotor 62 is connected to the above described ECU 40 through an EDU (Electrical Driver Unit) 64. In addition to the aforementioned crank angle sensor 42, a cam angle sensor 66 that detects a rotational angle of the camshaft 50, and a control shaft position sensor 68 that detects a rotational position (rotational angle) of the control shaft 54 are connected to the ECU 40. According to this configuration, the rotational position (rotational angle) of the control shaft 54 can be controlled by controlling the rotational direction and rotational amount of the servomotor 62. Since the intake variable valve operating apparatus 32 is an apparatus that can continuously change the working angle of the intake valve 28 in accordance with the rotational position of the control shaft 54, the working angle and lift amount of the intake valve 28 can be acquired based on an output value of the control shaft position sensor 68.

The intake variable valve operating apparatus 32 also includes a swing arm (swing cam arm) 70. The swing arm 70 is arranged so as to be capable of swinging around the control shaft 54. A slide surface 72 is formed on a side facing the drive cam 52 in the swing arm 70.

A first roller 74 and a second roller 76 are arranged between the swing arm 70 and the drive cam 52. The first roller 74 contacts the circumferential surface of the drive cam 52. The second roller 76 contacts a slide surface 72 of the swing arm 70. The rollers 74 and 76 are arranged on the same axis, and can rotate independently of each other.

The rollers 74 and 76 are supported at a distal end portion of a support arm 78. A control arm 80 that protrudes in the downward direction in FIG. 3 is provided on the control shaft 54. A proximal end portion of the support arm 78 is rotatably connected to a distal end portion of the control arm 80. Thus, the rollers 74 and 76 can be moved by rotating the control shaft 54. More specifically, when the control shaft 54 is rotated clockwise from the state shown in FIG. 3, the rollers 74 and 76 are pulled by the control arm 80 and the support arm 78 and approach the swing center of the swing arm 70 (that is, the center of the control shaft 54). Further, when the control shaft 54 is rotated counterclockwise from a state in which the rollers 74 and 76 are positioned close to the swing center, the rollers 74 and 76 move away from the swing center.

FIG. 3 illustrates a state in which the positions of the rollers 74 and 76 are furthest away from the swing center. The slide surface 72 is formed as a curved surface (for example, an arcuate surface) such that a distance between the slide surface 72 and the center of the drive cam 52 gradually narrows as a position on the slide surface 72 approaches the swing center side from the distal end side of the swing arm 70.

A swing cam surface 82 is formed on a side of the swing arm 70 that opposite to the slide surface 72. The swing cam surface 82 includes a non-working surface (base circle portion) 82a that is formed so that a distance thereto from the swing center of the swing arm 70 is constant, and a working surface 82b that is provided so as to continue from the non-working surface 82a and is formed so that a distance thereto from the swing center gradually increases. The swing arm 70 formed in this manner is urged in the counterclockwise direction in FIG. 3 by a lost motion spring that is not illustrated in the drawings. The urging force of the lost motion spring pushes the swing arm 70 against the second roller 76, and pushes the first roller 74 against the drive cam 52.

The intake variable valve operating apparatus 32 further includes a rocker arm 84 that presses a valve shaft of the intake valve 28 in a lift direction. The rocker arm 84 is arranged below the swing arm 70 is FIG. 3. A rocker roller 86 is provided so as to face the swing cam surface 82 in the rocker arm 84. The rocker roller 86 is rotatably mounted on an intermediate portion of the rocker arm 84. One end of the rocker arm 84 abuts against an end of the valve shaft of the intake valve 28. The other end of the rocker arm 84 is supported by a hydraulic lash adjuster 88. The intake valve 28 is urged in a closing direction, that is, a direction that pushes up the rocker arm 84, by an unshown valve spring. The rocker roller 86 is pressed against the swing cam surface 82 of the swing arm 70 by the aforementioned urging force and the hydraulic lash adjuster 88. According to this configuration, when the drive cam 52 rotates, the cam lift of the drive cam 52 is transmitted to the swing arm 70 through the rollers 74 and 76 and causes the swing arm 70 to swing.

In the swing arm 70, a lost motion portion 92 that is constituted by a surface that is depressed relative to a hypothetical extension line 90 of the slide surface 72 is formed at the tip of the slide surface 72. In the state illustrated in FIG. 3, the second roller 76 contacts the lost motion portion 92. In this state, as described later, even if the swing arm 70 swings as a result of the drive cam 52 rotating, a valve stopped state is entered in which the intake valve 28 is maintained in a closed position.

When the control shaft 54 is rotated clockwise from the valve stopped state shown in FIG. 3, the rollers 74 and 76 move in a direction that approaches the swing center of the swing arm 70. Thus, a state is entered in which the second roller 76 contacts the slide surface 72. In this state, the intake valve 28 performs an opening/closing operation when the drive cam 52 rotates and causes the swing arm 70 to swing. Hereunder, this state is referred to as a "valve working state".

In the valve working state, when the drive cam 52 is not lifting, that is, when the base circle portion of the drive cam 52 is contacting the first roller 74, the rocker roller 86 is contacting the non-working surface 82a of the swing cam surface 82. As a result, the intake valve 28 is closed. Subsequently, when the drive cam 52 begins lifting and the swing arm 70 starts to swing in the clockwise direction in FIG. 3, a contact point between the rocker roller 86 and the swing cam surface 82 (hereunder, referred to as a "rocker roller contact point") moves from the non-working surface 82a to the working surface 82b. When the rocker roller contact point moves to the working surface 82b, the rocker arm 84 is pushed downward and the intake valve 28 opens.

It will now be assumed that the rollers 74 and 76 are at the closest position to the swing center of the swing arm 70. At this time, since the cam lift of the drive cam 52 is transmitted to the swing arm 70 at a position close to the swing center, the swinging range (swing width) of the swing arm 70 increases. Therefore the working angle of the intake valve 28 increases. Further, as described above, a distance between the slide surface 72 and the center of the drive cam 52 decreases as the proximity to the swing center increases. Hence, the greater the degree to which the rollers 74 and 76 approach the swing center, the greater the degree to which the position of the swing arm 70 at a time when the drive cam 52 begins lifting moves to the clockwise side in FIG. 3. Consequently, a rotational amount of the swing arm 70 that is required until the rocker roller contact point moves to the working surface 82b (that is, until lifting of the intake valve 28 begins) after the swing arm 70 starts to swing decreases as the proximity of the rollers 74 and 76 to the swing center increases. The working angle of the intake valve 28 also increases for this reason.

Conversely, when it is assumed that the rollers 74 and 76 are at a far position from the swing center of the swing arm 70, in this case, the cam lift of the drive cam 52 is transmitted to the swing arm 70 at a position that is far from the swing center. Therefore, the swinging range (swing width) of the swing arm 70 decreases. Further, a rotational amount of the swing arm 70 that is required until the rocker roller contact point moves to the working surface 82b after the swing arm 70 starts to swing increases in accordance with the distance of the rollers 74 and 76 from the swing center. For these reasons, the working angle of the intake valve 28 decreases as the distance of the rollers 74 and 76 from the swing center increases.

As described above, according to the intake variable valve operating apparatus 32, in the valve working state, the greater the degree to which the rotational position of the control shaft 54 is displaced to the clockwise side in FIG. 3, the greater the degree to which the working angle of the intake valve 28 can be continuously increased. Conversely, the greater the degree to which the rotational position of the control shaft 54 is displaced to the counterclockwise side in FIG. 3, the greater the degree to which the working angle of the intake valve 28 can be continuously decreased. Further, when the rotational position of the control shaft 54 is displaced by a large amount to the counterclockwise side until the second roller 76 reaches a position at which the second roller 76 contacts the lost motion portion 92, even if the swing arm 70 swings accompanying rotation of the drive cam 52, the rocker roller contact point stays at the non-working surface 82a and does not reach the working surface 82b. Thus, the operating state of the intake valve 28 can be transitioned to the valve stopped state.

[Characteristic Control in First Embodiment]

When performing a fuel-cut operation, such as at a time of deceleration, while the internal combustion engine 10 is operating, if fresh air that has a high oxygen concentration flows into the catalyst 36 that is in a high-temperature state, there is a concern that the fresh air will cause the catalyst 36 to deteriorate. Therefore, according to the present embodiment, when the temperature of the catalyst 36 is equal to or greater than a predetermined temperature when executing a fuel-cut operation, a configuration is adopted so as to transition the operating state of the intake valve 28 to a valve stopped state using the intake variable valve operating apparatus 32 to ensure that fresh air does not flow into the catalyst 36.

However, according to the configuration of the intake variable valve operating apparatus 32 of the present embodiment, in order to place the operating state of the intake valve 28 in the valve stopped state, it is necessary to transition the intake valve 28 to the valve stopped state by continuously changing the working angle (and lift amount) of the intake valve 28. As a result, the time required to transition to the valve stopped state and, furthermore, the time required for transitioning (returning) the operating state of the valve from the valve stopped state to a combustion limit operating state in which the smallest working angle (hereunder, referred to as a "combustion limit minimum working angle") of the intake valve 28 at which combustion of the internal combustion engine 10 is enabled can be obtained are long compared to a variable valve operating apparatus that can alternatively switch the operating state of the valve between the valve working state and the valve stopped state. Consequently, there is a risk that fresh air will flow out toward the catalyst 36 during such transition periods.

Therefore, according to the present embodiment, a configuration is adopted so as to perform the following control in order to suppress deterioration of the catalyst 36 that is ascribable to a control delay of the intake variable valve operating apparatus 32 when transitioning to the valve stopped state accompanying a fuel-cut operation and when transitioning from the valve stopped state to the aforementioned combustion limit operating state.

More specifically, according to the present embodiment, when a request to execute a fuel-cut operation is generated, if the temperature of the catalyst 36 is equal to or greater than a predetermined temperature, execution of the fuel-cut operation is inhibited until the working angle of the intake valve 28 that is in the process of transitioning to the valve stopped state reaches the aforementioned combustion limit minimum working angle. Subsequently, at a time point at which the working angle of the intake valve 28 reaches the combustion limit minimum working angle, the fuel-cut operation is executed. Furthermore, a configuration is adopted so that, upon utilizing the control shaft position sensor 68 to determine a control time period A from a time point of arriving at the combustion limit minimum working angle (that is, a time point at which execution of a fuel-cut operation starts) until a time point at which transition of the operating state of the intake valve 28 to the valve stopped state is completed, an air amount A that flows out from inside the cylinders toward the catalyst 36 during the control time period A is calculated based on the control time period A and the number of engine revolutions at the time point of arriving at the combustion limit minimum working angle (hereunder, this number of engine revolutions is referred to as a "combustion limit minimum number of revolutions").

Further, according to the present embodiment, a configuration is adopted so that, when a request to return from a fuel-cut state (in the case of returning from a fuel cut that accompanied a halt of operation of the internal combustion engine 10, a request to start-up the internal combustion engine 10) is generated, if the temperature of the catalyst 36 is equal to or greater than a predetermined temperature, upon utilizing the control shaft position sensor 68 to determine a control time period B that is required until transition from the valve stopped state to the aforementioned combustion limit operating state at which the combustion limit minimum working angle can be obtained, an air amount B that flows out from inside the cylinders to the catalyst 36 during the control time period B is calculated based on the control time period B and the combustion limit minimum number of revolutions.

Moreover, according to the present embodiment, a configuration is adopted so that, at the time point at which the combustion limit minimum working angle (combustion limit minimum number of revolutions) is reached, fuel injection of an amount that is in accordance with a total value (A+B) of the above described outflow air amount A and air amount B is performed so that fuel is supplied into the exhaust passage 18 prior to reversion from a fuel-cut state (resumption of combustion).

Next, specific processing of the first embodiment of the present invention is described referring to FIG. 4 to FIG. 7.

Figure 4:
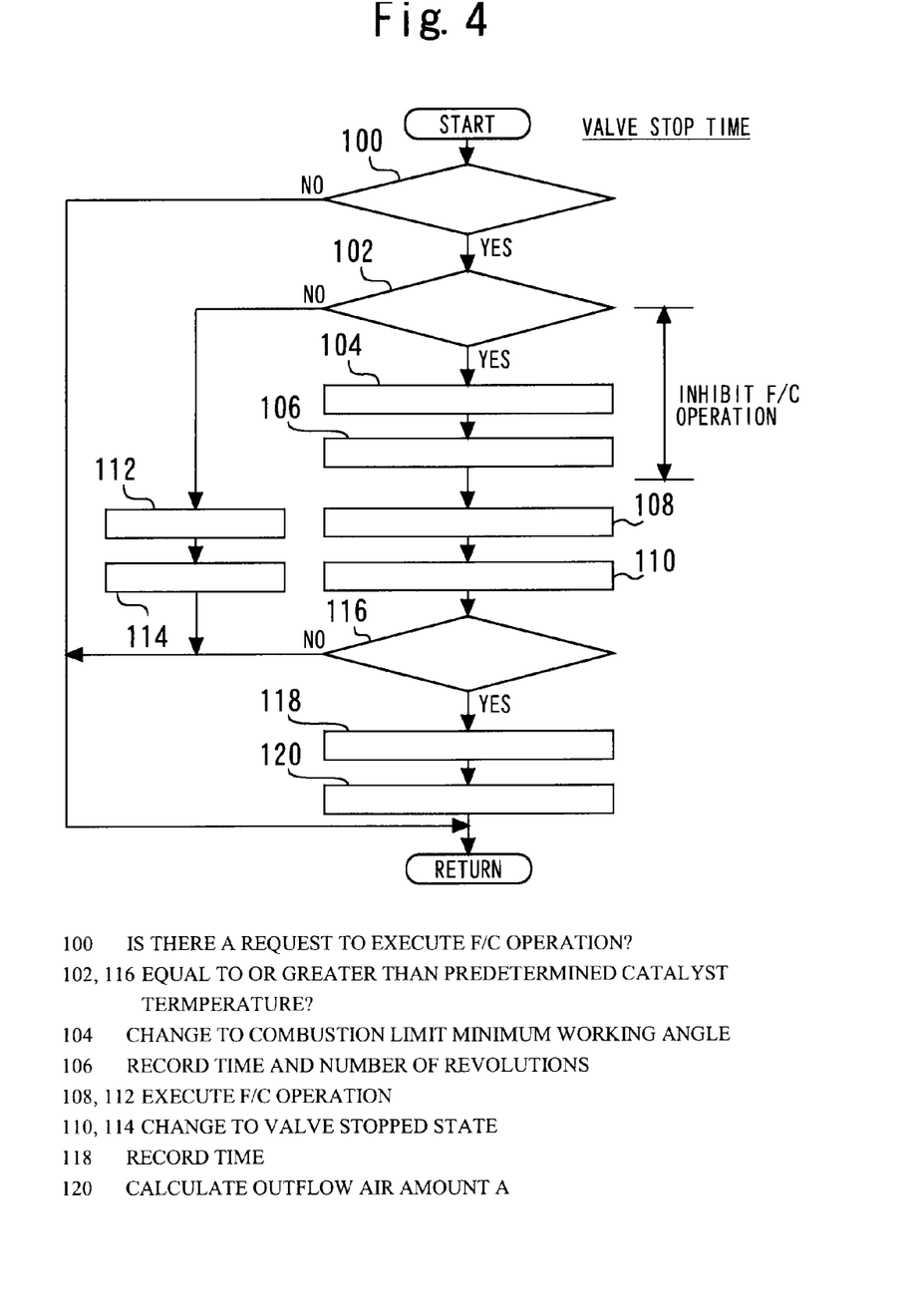
FIG. 4 is a flowchart of a routine that is executed in the first embodiment of the present invention when a request to execute a fuel-cut operation is generated.

FIG. 4 is a flowchart that illustrates a control routine that the ECU 40 executes when a request to execute a fuel-cut operation is generated according to the first embodiment to realize the above described functions.

According to the routine illustrated in FIG. 4, first, it is determined whether or not there is a request to execute a fuel-cut (F/C) operation (step 100).

If, as a result, it is determined that a request to execute a fuel-cut operation has been generated, it is determined whether or not the temperature of the catalyst 36 is equal to or greater than a predetermined temperature (step 102). The predetermined temperature in step 102 is a value that is previously set as a threshold value for determining whether or not the circumstances are such that there is a concern that deterioration of the catalyst 36 will occur if fresh air flows into the catalyst 36. In this connection, the temperature of the catalyst 36 can be estimated, for example, based on the operation history of the internal combustion engine 10 or acquired using a temperature sensor.

If it is determined in the aforementioned step 102 that the temperature of the catalyst 36 is equal to or greater than the predetermined temperature, that is, if it can be determined that the circumstances are such that there is a concern that deterioration of the catalyst 36 will occur if fresh air flows into the catalyst 36, the intake variable valve operating apparatus 32 is controlled so that the working angle of the intake valve 28 that is being controlled to a value that is in accordance with the current operating state becomes the aforementioned combustion limit minimum working angle (step 104).

Thereafter, at a time point at which the working angle of the intake valve 28 arrives at the aforementioned combustion limit minimum working angle, recording of the above described control time period A is started and the number of engine revolutions at the current time point is recorded (step 106). The time point at which the combustion limit minimum working angle in step 106 is arrived can be ascertained by means of an output value of the control shaft position sensor 68 (see FIG. 5 or FIG. 6 that are described later). Further, a fuel-cut operation is executed at the present time point of arrival at the combustion limit minimum working angle (step 108). Subsequently, the intake variable valve operating apparatus 32 is controlled so that the operating state of the intake valve 28 becomes the valve stopped state (step 110).

In contrast, if the result determined in the above described step 102 is negative, since deterioration of the catalyst 36 due to an inflow of fresh air is not a concern, the intake variable valve operating apparatus 32 is immediately controlled so as to enter the valve stopped state upon execution of a fuel-cut operation (steps 112 and 114).

After transition of the operating state of the intake valve 28 to the valve stopped state is completed, it is then determined again whether or not the temperature of the catalyst 36 is equal to or greater than the predetermined temperature (step 116). If, as a result, it is determined that the temperature of the catalyst 36 is equal to or greater than the predetermined temperature, the control time period A is calculated by recording the current time (step 118).

Next, the air amount A that flowed out to the catalyst 36 during the control time period A is calculated based on the control time period A calculated in the aforementioned step 118 and the combustion limit minimum number of revolutions at the time of arriving at the combustion limit minimum working angle that were recorded in the aforementioned step 106 (step 120).

Figure 5:
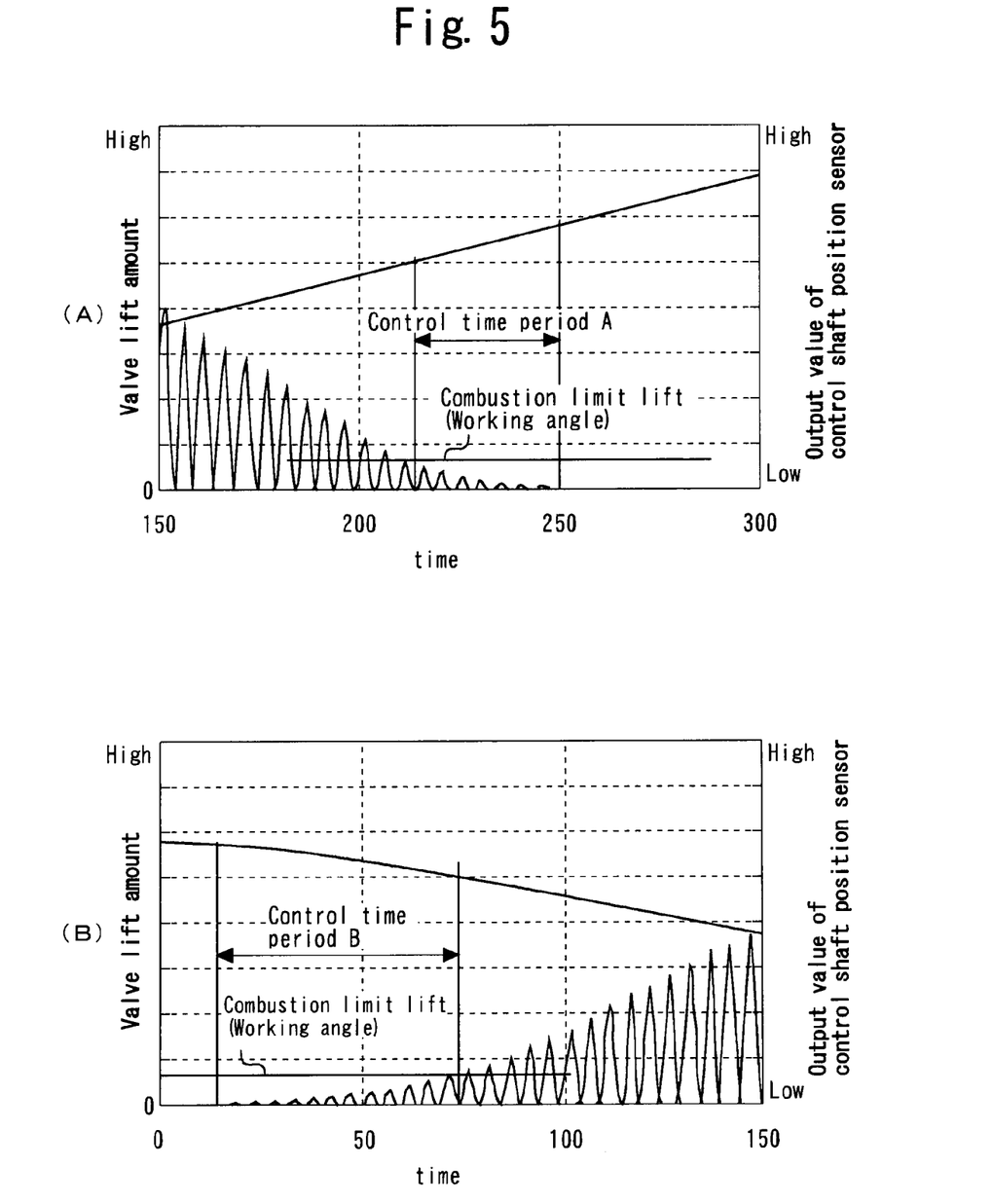
FIG. 5 is a view that represents changes in a valve lift amount and an output value of a control shaft position sensor at a time the valve is stopped and a time the valve returns to a working state, with respect to a region in which there is a high number of engine revolutions.
Figure 6:
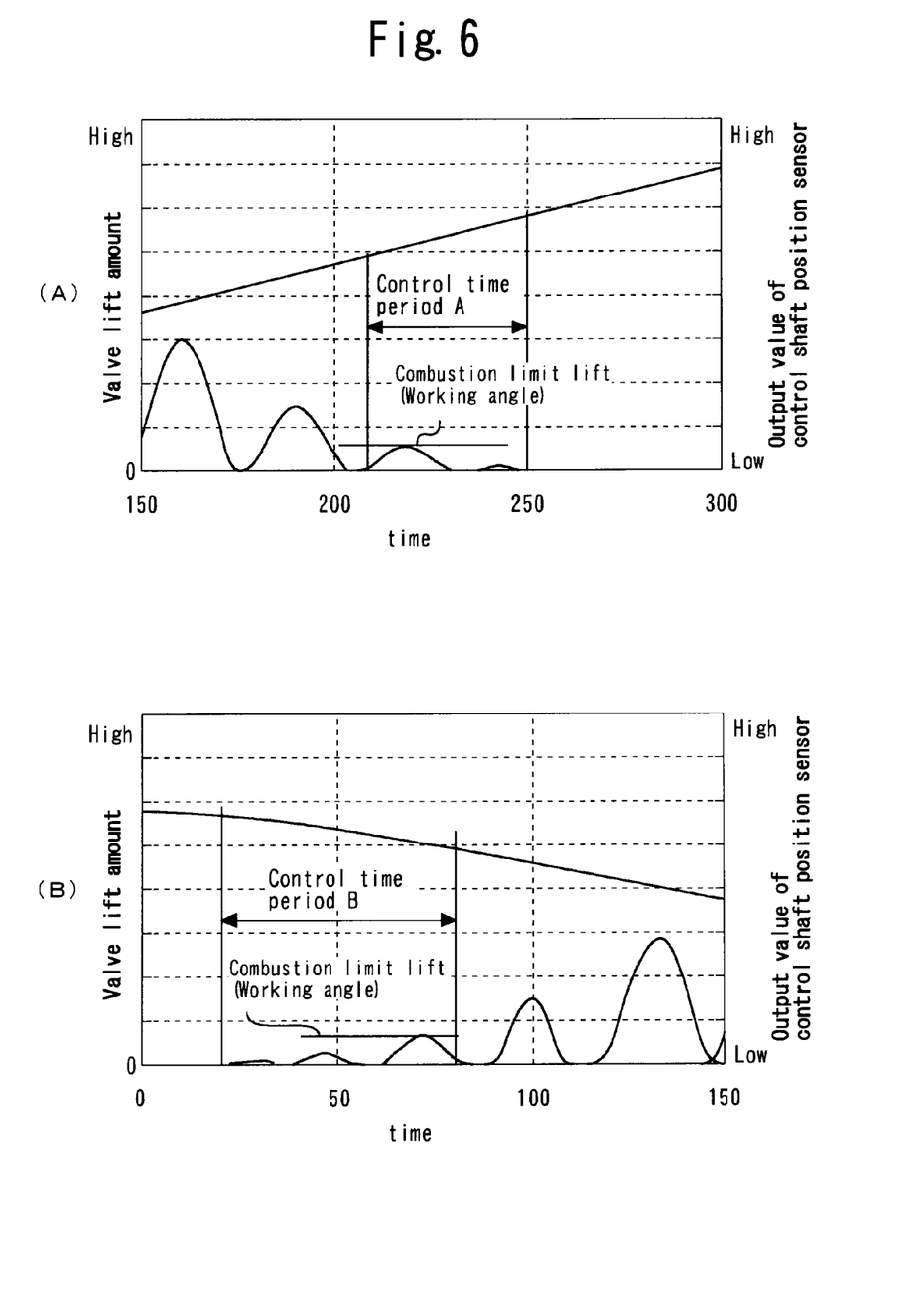
FIG. 6 is a view that represents changes in a valve lift amount and an output value of the control shaft position sensor 68 at a time the valve is stopped and a time that the valve returns to a working state, with respect to a region in which there is a low number of engine revolutions.

FIG. 5 is a view that represents changes in a valve lift amount and an output value of the control shaft position sensor 68 at a time the valve is stopped and a time the valve returns to a working state, with respect to a region in which there is a high number of engine revolutions. FIG. 6 is a view that represents changes in a valve lift amount and an output value of the control shaft position sensor 68 at a time the valve is stopped and a time that the valve returns to a working state, with respect to a region in which there is a low number of engine revolutions. More specifically, FIG. 5(A) and FIG. 6(A) illustrate the respective relations at a time that the valve is stopped, and FIG. 5(B) and FIG. 6(B) illustrate the respective relations at a time the valve returns to a working state.

A fuel cut is an operation that is started at an arbitrary number of engine revolutions while the internal combustion engine 10 is running. Therefore, the combustion limit minimum number of revolutions also differs according to the number of engine revolutions when a fuel-cut operation starts. When the values of the combustion limit minimum number of revolutions differ, as will be understood by comparing FIG. 5 with FIG. 6, during the control time period A from the time point of reaching the combustion limit minimum working angle (combustion limit minimum lift) until entering the valve stopped state, the number of times that the intake valve 28 lifts varies, and the air amount (oxygen amount) A that flows out from each cylinder into the catalyst 36 varies. More specifically, the air amount A that flows out increases accompanying an increase in the combustion limit minimum number of revolutions. The above fact similarly applies during the control time period B from the valve stopped state until entering the aforementioned combustion limit operating state at which the above described combustion limit minimum working angle can be obtained.

Accordingly, it is possible to ascertain the number of times that the intake valve 28 lifts during the control time period A by acquiring the control time period A and the combustion limit minimum number of revolutions as in the processing in this step 120. Therefore, by previously storing a map (not shown) that determines an air amount A that flows out to the catalyst 36 using the relation between the control time period A and the combustion limit minimum number of revolutions in the ECU 40, the outflow air amount A can be calculated based on the control time period A and the combustion limit minimum number of revolutions.

Figure 7:
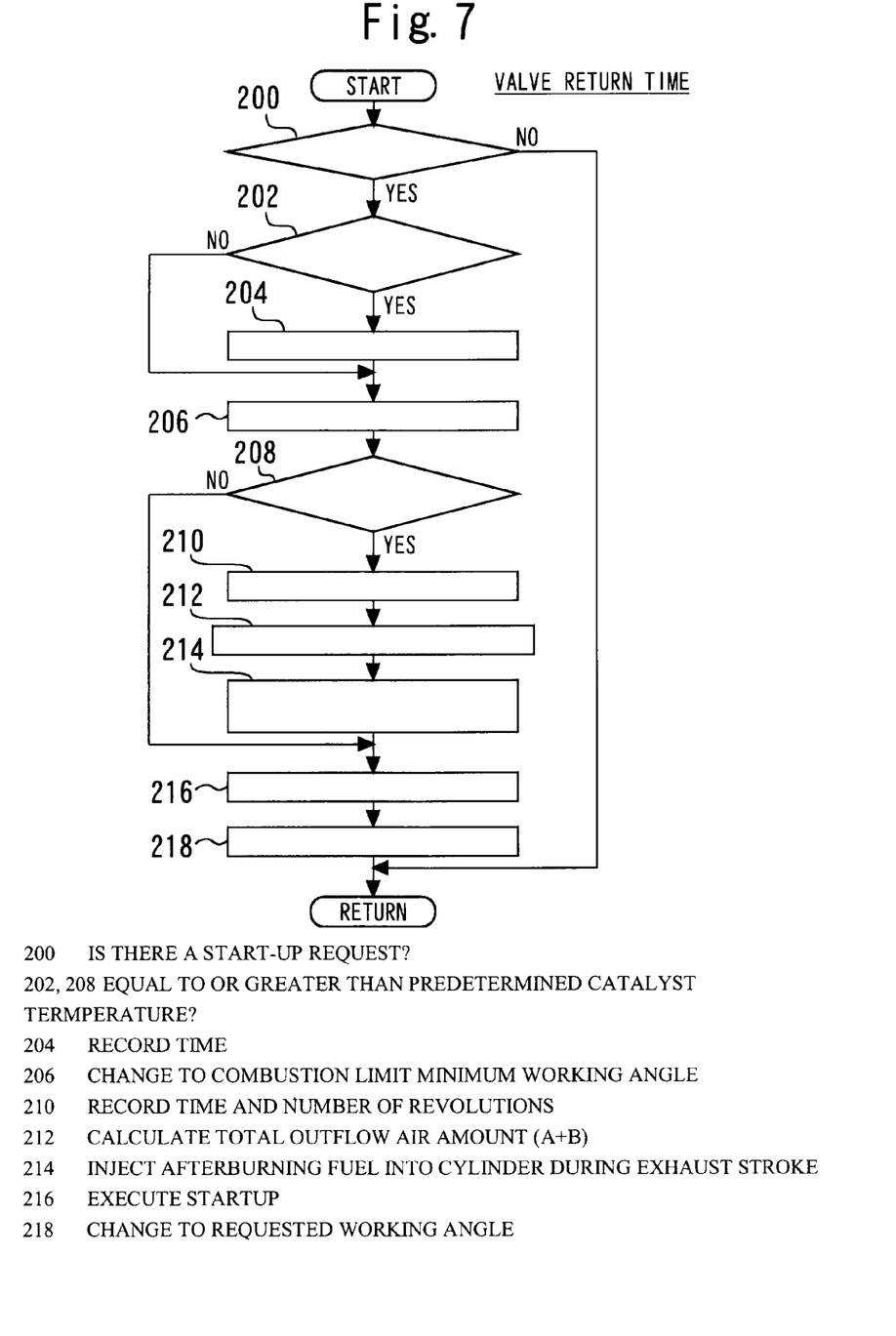
FIG. 7 is a flowchart of a routine that is executed in the first embodiment of the present invention when a request to return from a fuel-cut state is generated (a request to start-up the internal combustion engine)

FIG. 7 is a flowchart that illustrates a control routine that the ECU 40 executes when a request to return from a fuel-cut state is generated according to the first embodiment to realize the above described functions. In this case, as an example of a situation in which a request to return from a fuel-cut state is generated, a situation is described in which a request is generated to start-up the internal combustion engine 10 after the internal combustion engine 10 has been placed in a stopped state accompanying the fuel-cut operation. However, the present routine is not limited to such a situation in which a request to start-up the internal combustion engine is generated, and naturally the present routine is also applicable to a situation in which a normal request to return from a fuel-cut state is generated in a state in which revolutions of the internal combustion engine 10 are continuing after executing a fuel-cut operation.

According to the routine illustrated in FIG. 7, first, it is determined whether or not there is a request to start-up the internal combustion engine 10 (step 200). In this connection, in a situation in which a normal request to return from a fuel-cut state is generated, instead of the processing in this step 200, it is determined whether or not there is a request to return from a fuel-cut state. If it is determined in the aforementioned step 200 that a start-up request has been generated, it is next determined whether or not the temperature of the catalyst 36 is equal to or greater than the above described predetermined temperature (step 202).

If it is determined in the aforementioned step 202 that the temperature of the catalyst 36 is equal to or greater than the predetermined temperature, recording of the control time period B is started at the start of cranking of the internal combustion engine 10 (step 204). Subsequently, the intake variable valve operating apparatus 32 is controlled so that the working angle of the intake valve 28 that is in a valve stopped state becomes the above described combustion limit minimum working angle (step 206). In contrast, if the temperature of the catalyst 36 has not reached the predetermined temperature, recording of the control time period B is not started, and the intake variable valve operating apparatus 32 is controlled so that the working angle of the intake valve 28 becomes the above described combustion limit minimum working angle (step 206).

Thereafter, at a time point at which the working angle of the intake valve 28 reaches the aforementioned combustion limit minimum working angle, it is determined again whether or not the temperature of the catalyst 36 is equal to or greater than the predetermined temperature (step 208). If, as a result, it is determined that the temperature of the catalyst 36 has not reached the predetermined temperature, in step 216, which is described later, fuel injection and ignition for starting up the internal combustion engine 10 are immediately executed. In contrast, if it is determined that the temperature of the catalyst 36 is equal to or greater than the predetermined temperature, the control time period B is calculated by recording the current time, and the number of engine revolutions at the current time is also recorded (step 210).

Next, a total outflow air amount (A+B) is calculated that is the sum of the air amount A that flows out to the catalyst 36 during the control time period A and the air amount B that flows out to the catalyst 36 during the control time period B (step 212). A value calculated by the processing in the aforementioned step 120 is used as the air amount A. A value can also be calculated for the air amount B by the same processing as in the aforementioned step 120. Thus, the total outflow air amount (A+B) can be calculated.

Next, fuel injection is executed using the fuel injection valve 24 at a time that an exhaust stroke has arrived in a predetermined cylinder so as to supply fuel (afterburning fuel) of an amount in accordance with the total outflow air amount (A+B) into the exhaust passage 18 (step 214). The fuel injection amount in accordance with the total outflow air amount (A+B) that is referred to in the aforementioned step 214 is a fuel amount that is injected to ensure that the atmosphere of the catalyst 36 does not become an oxidative atmosphere (lean atmosphere), and the greater that the total outflow air amount (A+B) is, the greater the amount of fuel that is injected. The fuel amount that is injected in this case may also be, for example, a fuel amount that is required to obtain a theoretical air fuel ratio based on the relation with the total outflow air amount (A+B). As a result, a configuration can be adopted so that, after combusting outflowing air inside the exhaust passage 18, gas having a theoretical air fuel ratio with a low oxygen concentration flows into the catalyst 36.

After the above described fuel injection has been performed, fuel injection and ignition for starting up the internal combustion engine 10 are executed (step 216). It is noted that, in a situation in which a normal request to return from a fuel-cut state is generated, instead of the processing in the aforementioned step 216, an operation to return from the fuel-cut state, that is, an operation to resume fuel injection, is executed. Subsequently, the working angle of the intake valve 28 is controlled using the intake variable valve operating apparatus 32 so as to be the working angle that is demanded according to the operating state after start-up.

According to the processing of the routines illustrated in FIG. 4 and FIG. 7 that are described above, when the temperature of the catalyst 36 is equal to or greater than the above described predetermined temperature, fuel injection is executed so that fuel is supplied into the exhaust passage 18 in an amount that is in accordance with the total outflow air amount (A+B) that flowed out from the cylinders toward the catalyst 36 at the time of a valve stop and at the time of a valve return. According to the present embodiment, when executing a fuel-cut operation, the operating state of the intake valve 28 is placed in a valve stopped state, and the exhaust valve 30 is driven to open and close as usual. Generally, since the exhaust valve 30 and the catalyst 36 are separated to a certain degree, it is considered that in a situation in which the valves 28 and 30 are driven in this manner, air that flows out from inside the cylinders into the exhaust passage 18 moves back and forth between the inside of the cylinders and (an exhaust manifold of) the exhaust passage 18. Therefore, by performing fuel injection as described above when returning (immediately before returning) from a fuel-cut state, oxygen included in air that has flowed out from the cylinders into the exhaust passage 18 can be combusted by afterburning in the exhaust passage 18. It is thus possible to prevent the occurrence of a state in which the aforementioned air having a high oxygen concentration that flowed out from the cylinders flows into the catalyst 36 that is in a high-temperature state. Consequently, deterioration of the catalyst 36 can be suppressed.

Further, according to the processing of the above described routines, when transitioning to the valve stopped state accompanying a fuel-cut operation, and when transitioning from the valve stopped state to the above described combustion limit operating state, upon calculating the aforementioned outflow air amounts A and B, fuel injection is performed with an amount that is in accordance with the total outflow air amount (A+B). As described in the foregoing, the outflow air amounts A and B vary in accordance with changes in the combustion limit minimum number of revolutions that depend on the number of engine revolutions when a fuel-cut operation starts. Accordingly, by ensuring that fuel injection is performed using an amount in accordance with the total outflow air amount (A+B) calculated as described above, fuel injection can be performed with an appropriate amount that is in accordance with the total outflow air amount (A+B) at each particular time.

Further, according to the processing of the above described routines, if the temperature of the catalyst 36 is equal to or greater than the predetermined temperature when a request to execute a fuel-cut operation is generated, execution of the fuel-cut operation is inhibited until the working angle of the intake valve 28 that is in the process of transitioning to the valve stopped state arrives at the aforementioned combustion limit minimum working angle. As a result, compared to a case in which a fuel-cut operation is immediately executed upon receiving an execution request without taking the measures described above, it is possible to decrease an air amount that flows out from inside the cylinders toward the catalyst 36 when transitioning to the valve stopped state accompanying a fuel-cut operation.

In the above described first embodiment, a configuration is adopted so that, at a time point at which the combustion limit minimum working angle is reached when returning (immediately prior to returning) from a fuel-cut state, fuel injection is performed with an amount that is in accordance with the total outflow air amount (A+B). However, according to the present invention, the timing for executing fuel injection that is performed to suppress deterioration of a catalyst is not limited thereto. More specifically, for example, in a case where a configuration is adopted in which the operating state of the intake valve 28 is placed in the valve stopped state when executing a fuel-cut operation and the exhaust valve 30 is driven to open and close as normal as described above in the first embodiment, if a distance between the exhaust valve 30 and the catalyst 36 is short, the aforementioned fuel injection may be performed during a fuel-cut execution period after the intake valve 28 has been placed in the valve stopped state, and not at the time of returning from a fuel-cut state. It is thereby possible to suppress the occurrence of a situation in which gas that is moving back and forth between the inside of the cylinders and the exhaust passage 18 flows into the catalyst 36 in a state in which the gas has a high oxygen concentration.

In many cases, a fuel-cut operation is started when the number of engine revolutions is high. When a fuel-cut operation is executed in a region of a high number of engine revolutions, the flow rate of air that is discharged from inside the cylinders is high and a range in which the air flows back and forth between the inside of the cylinders and the exhaust passage 18 widens. Therefore, a configuration may be adopted that does not inject fuel of an amount that is in accordance with the total of the outflow air amount A and the outflow air amount B at one time, but rather executes fuel injection that takes the outflow air amount A as a target during a period in which the operating state of the intake valve 28 is transitioning to the valve stopped state. Further, with regard also to fuel injection that takes the outflow air amount B as a target, similarly, a configuration may be adopted so as to execute the fuel injection during a transition period from the valve stopped state to the combustion limit operating state.

The above first embodiment has been described taking as an example an apparatus configured so that the operating state of the intake valve 28 can be changed to the valve stopped state by continuously changing (reducing) the working angle and the lift amount of the intake valve 28 until the second roller 76 reaches a position at which the second roller 76 contacts the lost motion portion 92 that is provided at the distal end of the slide surface 72 of the swing arm 70 in the intake variable valve operating apparatus 32 that can continuously change the working angle and lift amount of the intake valve 28 according to the rotational position of the control shaft 54. However, a variable valve operating apparatus that is an object of the present invention is not limited to the above described configuration. More specifically, for example, the present invention can be applied to a variable valve operating apparatus disclosed in Japanese Patent No. 3799944. According to this variable valve operating apparatus, a configuration is adopted so that, by changing an axial direction position of a control shaft, the range of a swinging action of a swing arm changes, and the working angle and lift amount of a valve can be continuously changed. Further, according to the aforementioned variable valve operating apparatus, even if the swing arm swings accompanying rotation of the drive cam, by displacing the control shaft in the axial direction until a state is entered in which a contact point between the swing arm and a rocker roller stays within a non-working surface of the swing arm and the working surface is not contacted, the operating state of the valve can be transitioned to the valve stopped state. The control of the first embodiment that is described above can also be applied to the variable valve operating apparatus having the above described configuration by providing a control shaft position sensor that detects an axial direction position (a stroke) of the control shaft.

The present invention can also be applied to a variable valve operating apparatus disclosed in, for example, Japanese Patent No. 3893202. More specifically, this variable valve operating apparatus mainly includes a cam shaft, two eccentric cams that are fixed to the cam shaft, a control shaft that is rotatably arranged above the cam shaft, a pair of rocker arms that are supported in a freely swinging condition by the control shaft through a control cam, and a pair of swing cams that are arranged above a valve lifter that is provided at an upper end of an intake valve. The eccentric cams and the rocker arms are mechanically linked by substantially annular link arms. The rocker arms and the swing cams are mechanically linked by substantially rod-shaped link members. According to the variable valve operating apparatus, the positional relationship between each of the above described members is changed by changing the rotational position of the control shaft by means of an electromagnetic actuator, and thus the cam lifting characteristics of the swing cams can be continuously changed. Further, according to the variable valve operating apparatus, a configuration is adopted so that the intake valve is maintained in a valve stopped state in a case where the rotational position of the control shaft is changed so that a state is entered in which the cam lift is the minimum lift. The control of the first embodiment that is described above can also be applied to the variable valve operating apparatus having the above described configuration by providing a control shaft position sensor that detects the rotational position of the control shaft.

Furthermore, the present invention can be applied to a variable valve operating apparatus disclosed in, for example, National Publication of International Patent Application No. 2004-521234. More specifically, this variable valve operating apparatus mainly includes a cam shaft to which a drive cam is fixed, a transfer element (rocker arm) that presses a valve shaft of a valve in a lift direction, an adjusting apparatus that functions as the control shaft of the present invention, and a rotation lever (swing arm) that is arranged so as to be sandwiched between three of the aforementioned members, namely, the drive cam, the transfer element, and the adjusting apparatus. According to the variable valve operating apparatus, the working angle and lift amount of the valve can be continuously changed by changing the posture of the rotation lever by changing the rotational position of the adjusting apparatus (control shaft). According to the variable valve operating apparatus having such configuration, it is possible to maintain the intake valve in a valve stopped state by adjusting the rotational position of the adjusting apparatus (control shaft) by appropriately changing the swinging range of the rotation lever or changing the profile of the control trajectory (swing cam surface) of the rotation lever so as to enable the valve stopped state. The control of the first embodiment that is described above can also be applied to the variable valve operating apparatus having the above described configuration by providing a control shaft position sensor that detects the rotational position of the adjusting apparatus (control shaft).

Furthermore, in the above described first embodiment, a configuration is adopted so as to acquire the working angle and lift amount of the intake valve 28 using the control shaft position sensor 68 that detects the rotational position of the control shaft 54. However, the valve operation amount acquisition means of the present invention is not limited thereto. More specifically, for example, a lift amount sensor that detects a lift amount of the valve may also be used, or the working angle and/or lift amount of the valve may also be acquired, for example, based on a driving amount of an actuator that drives the control shaft.

In addition, according to the above described first embodiment, when executing a fuel-cut operation, the operating state of the intake valve 28 is placed in the valve stopped state, and the exhaust valve 30 is driven to open and close as normal. However, the present invention is not limited to such a configuration, and is also applicable to a configuration in which, when executing a fuel-cut operation, the operating state of an exhaust valve is placed in a valve stopped state and an intake valve is driven to open and close as normal. Furthermore, the present invention can also be applied to a configuration in which, when executing a fuel-cut operation, the operating states of both an intake valve and an exhaust valve are placed in a valve stopped state.

Further, according to the above described first embodiment, a configuration is adopted that executes fuel injection so as to supply fuel into the exhaust passage 18 using the fuel injection valve 24 that is arranged in (the intake port of) the intake passage 16. However, fuel injection execution means according to the present invention is not limited to the one that is realized using such fuel injection valve 24. For example, an exhaust fuel addition valve may be used that is provided in the exhaust passage 18 and adds fuel directly into the exhaust passage 18.

It is noted that, in the above described first embodiment, "valve stop execution means" according to the above described first aspect of the present invention is realized by the ECU 40 executing the processing of the above described steps 100 and 108, "catalyst temperature acquisition means" according to the first aspect of the present invention is realized by the ECU 40 executing the processing of the above described step 102, 116, 202, or 208, and "fuel injection execution means" according to the first aspect of the present invention is realized by the ECU 40 executing the processing of the above described steps 200, 206, 208 and 214.

In addition, "valve stopped time air amount acquisition means" according to the above described second aspect of the present invention is realized by the ECU 40 executing the processing of the above described steps 106, 118, and 120, Further, "valve operation amount acquisition means" according to the above described third or sixth aspect of the present invention is realized by the ECU 40 acquiring the working angle and lift amount of the intake valve 28 based on an output value of the control shaft position sensor 68.

Furthermore, "fuel cut inhibition means" according to the above described fourth aspect of the present invention is realized by the ECU 40 executing the processing of the above described step 108 after the processing of the above described step 104 in a case where the result determined in the above described step 100 is affirmative.

Further, "valve reversion time air amount acquisition means" according to the above described second aspect of the present invention is realized by the ECU 40 executing the processing of the above described steps 204, 210, and 212.

Second Embodiment

Figure 8:
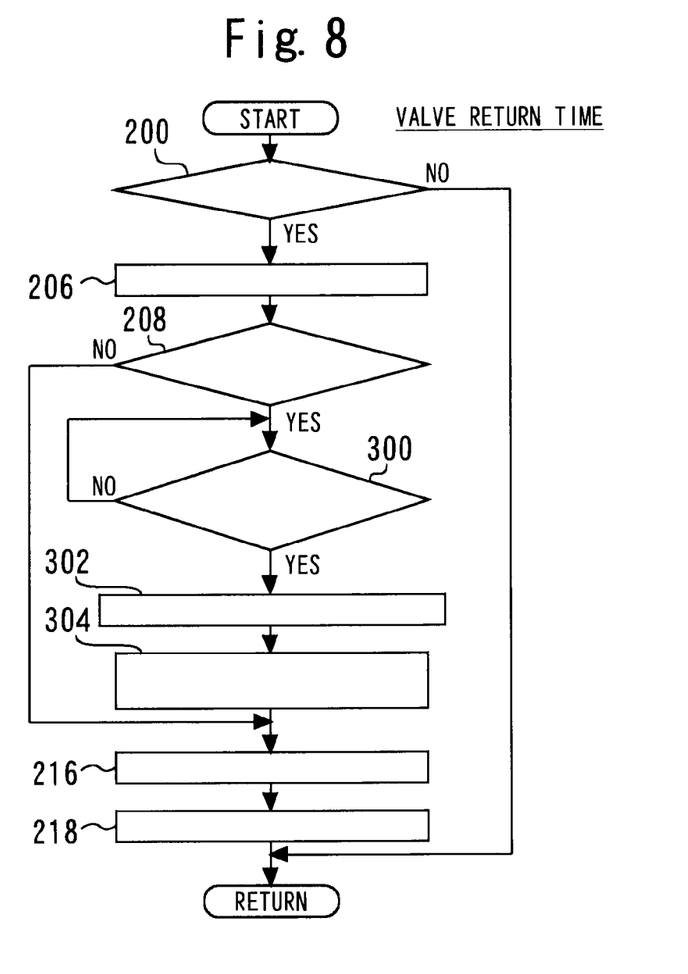
FIG. 8 is a flowchart of a routine that is executed in the second embodiment of the present invention when a request to return from a fuel-cut state is generated (a request to start-up the internal combustion engine).

Next, a second embodiment of the present invention is described referring to FIG. 8.

The system of the present embodiment can be realized using the hardware configuration illustrated in FIG. 1 to FIG. 3 by causing the ECU 40 to execute the routine shown in the above described FIG. 4 together with a routine shown in FIG. 8 that is described later.

A case that occurs with a high frequency as a case in which the intake valve 28 returns to the valve working state after being controlled to enter the valve stopped state accompanying a fuel-cut operation is a case where, as described in the foregoing first embodiment, the intake valve 28 returns from an engine stopped state to the valve working state when starting up the internal combustion engine 10 after the internal combustion engine 10 has been placed in an engine stopped state accompanying the fuel-cut operation. In such a case, reversion from the valve stopped state is performed by taking the engine stopped state in which the number of engine revolutions is zero as a starting point. Accordingly, unlike the case in which reversion from the valve stopped state is performed during execution of a fuel-cut operation in a state in which revolution of the internal combustion engine 10 continues, the number of times that the intake valve 28 lifts during a control time period that is required from a time point that cranking starts until a time point at which the number of engine revolutions reaches the combustion limit minimum number of revolutions is always a fixed value. It is therefore possible to previously calculate an air amount B that flows out from inside the cylinders toward the catalyst 36 during a transition period from the valve stopped state and the above described combustion limit operating state as well as a fuel injection amount that is in accordance with the relevant outflow air amount B.

FIG. 8 is a flowchart that illustrates a control routine that the ECU 40 executes when a request to return from a fuel-cut state is generated according to the second embodiment to realize the above described functions. It is noted that, in FIG. 8, steps that are the same as steps shown in FIG. 7 according to the first embodiment are denoted by the same reference numbers and a description of those steps is omitted or simplified.

According to the routine illustrated in FIG. 8, when it is determined in step 200 that a start-up request has been generated, without performing the processing of the above described steps 202 and 204, the intake variable valve operating apparatus 32 is immediately controlled so that the working angle of the intake valve 28 that is in the valve stopped state becomes the above described combustion limit minimum working angle (step 206).

Thereafter, at a time point at which the working angle of the intake valve 28 arrives at the combustion limit minimum working angle, if it is determined in step 208 that the temperature of the catalyst 36 is equal to or greater than the above described predetermined temperature, it is determined whether or not the number of engine revolutions has reached the combustion limit minimum number of revolutions (step 300). If, as a result, it is determined that the number of engine revolutions has reached the combustion limit minimum number of revolutions, the total outflow air amount (A+B) is calculated (step 302). A calculation value obtained by the processing in the above described step 120 is used as the air amount A. In the aforementioned step 302, unlike the above described step 212, with respect to the air amount B at the time of valve reversion, a value is used that is previously acquired based on the relation with the combustion limit minimum number of revolutions used in the present routine. Accordingly, the total outflow air amount (A+B) can be calculated.

Next, fuel injection using the fuel injection valve 24 is executed at the time of an exhaust stroke in a predetermined cylinder so that fuel (afterburning fuel) of an amount that is in accordance with the total outflow air amount (A+B) calculated in the above step 302 is supplied into the exhaust passage 18 (step 304). The processing thereafter is the same as in the routine illustrated in FIG. 7 described above, and hence a description thereof is omitted here.

According to the processing of the routine illustrated in FIG. 8 that is described above, in comparison to the processing of the routine shown in FIG. 7 according to the above described first embodiment, processing performed on the actual apparatus when a start-up request is generated can be simplified.

The invention claimed is:

1. A control apparatus for an internal combustion engine including a variable valve operating apparatus that, by continuously changing at least one of a lift amount or a working angle of a valve, is capable of changing an operating state of the valve to a valve stopped state in which the valve is maintained in a closed state, the control apparatus comprising:

valve stop execution means that, when a request to execute a fuel-cut operation is generated during operation of the internal combustion engine, controls so that the operating state of the valve becomes the valve stopped state using the variable valve operating apparatus;

catalyst temperature acquisition means that acquires a temperature of a catalyst that is arranged in an exhaust passage; and fuel injection execution means that, when the temperature of the catalyst is equal to or greater than a predetermined temperature, executes fuel injection so that fuel is supplied into the exhaust passage during a period in which the operating state of the valve transitions to the valve stopped state, a period in which the fuel-cut operation is executed in the valve stopped state, or a period in which the operating state of the valve transitions from the valve stopped state to a combustion limit operating state in which at least one of a minimum lift amount or working angle of the valve at which combustion of the internal combustion engine is enabled is obtained.

2. The control apparatus for an internal combustion engine including a variable valve operating apparatus according to claim 1, the control apparatus further comprising:

valve stopped time air amount acquisition means that acquires an air amount that flows out from inside a cylinder toward the catalyst during a process of the operating state of the valve transitioning to the valve stopped state, wherein the fuel injection execution means executes the fuel injection with an amount that is in accordance with an air amount that is acquired by the valve stopped time air amount acquisition means.

3. The control apparatus for an internal combustion engine including a variable valve operating apparatus according to claim 2, the control apparatus further comprising:

valve operation amount acquisition means that acquires at least one of a lift amount or a working angle of the valve, wherein the valve stopped time air amount acquisition means estimates and acquires the air amount based on a value of at least one of the lift amount or the working angle of the valve that is acquired by the valve operation amount acquisition means.

4. The control apparatus for an internal combustion engine including a variable valve operating apparatus according to claim 1, the control apparatus further comprising fuel cut inhibition means that, when a request to execute the fuel-cut operation is generated, if the temperature of the catalyst is equal to or greater than the predetermined temperature, inhibits execution of the fuel-cut operation until the operating state of the valve during transition to the valve stopped state reaches the combustion limit operating state.

5. The control apparatus for an internal combustion engine including a variable valve operating apparatus according to claim 1, the control apparatus further comprising:

valve return time air amount acquisition means that acquires an air amount that flows out from inside a cylinder toward the catalyst in a process of the operating state of the valve transitioning from the valve stopped state to the combustion limit operating state, wherein the fuel injection execution means executes the fuel injection with an amount that is in accordance with an air amount that is acquired by the valve return time air amount acquisition means.

6. The control apparatus for an internal combustion engine including a variable valve operating apparatus according to claim 5, the control apparatus further comprising:

valve operation amount acquisition means that acquires at least one of a lift amount or a working angle of the valve, wherein the valve return time air amount acquisition means is means that estimates and acquires the air amount based on a value of at least one of the lift amount or the working angle of the valve that is acquired by the valve operation amount acquisition means.

7. A control apparatus for an internal combustion engine including a variable valve operating apparatus that, by continuously changing at least one of a lift amount or a working angle of a valve, is capable of changing an operating state of the valve to a valve stopped state in which the valve is maintained in a closed state, the control apparatus comprising:

a controller that is programmed to:

when a request to execute a fuel-cut operation is generated during operation of the internal combustion engine, control so that the operating state of the valve becomes the valve stopped state using the variable valve operating apparatus;

acquire a temperature of a catalyst that is arranged in an exhaust passage; and when the temperature of the catalyst is equal to or greater than a predetermined temperature, execute fuel injection so that fuel is supplied into the exhaust passage during a period in which the operating state of the valve transitions to the valve stopped state, a period in which the fuel-cut operation is executed in the valve stopped state, or a period in which the operating state of the valve transitions from the valve stopped state to a combustion limit operating state in which at least one of a minimum lift amount or working angle of the valve at which combustion of the internal combustion engine is enabled is obtained.

8. The control apparatus for an internal combustion engine including a variable valve operating apparatus according to claim 1, wherein the fuel injection execution means executes the fuel injection when the temperature of the catalyst is equal to or greater than the predetermined temperature and when a number of engine revolutions is equal or greater than a combustion limit minimum number of revolutions.

9. The control apparatus for an internal combustion engine including a variable valve operating apparatus according to claim 7, wherein the controller is programmed to execute the fuel injection when the temperature of the catalyst is equal to or greater than the predetermined temperature and when a number of engine revolutions is equal or greater than a combustion limit minimum number of revolutions.

* * * * *